US010635796B2

(12) United States Patent
Tian et al.

(10) Patent No.: US 10,635,796 B2
(45) Date of Patent: Apr. 28, 2020

(54) METHOD FOR WEARABLE DEVICE AS WELL AS WEARABLE DEVICE AND POSITIONING SYSTEM ASSOCIATED THEREWITH

(71) Applicants: BOE TECHNOLOGY GROUP CO., LTD., Beijing (CN); BEIJING BOE MULTIMEDIA TECHNOLOGY CO., LTD., Beijing (CN)

(72) Inventors: Huiran Tian, Beijing (CN); Zheng Feng, Beijing (CN); Xiaodong Shi, Beijing (CN)

(73) Assignees: BOE TECHNOLOGY GROUP CO., LTD., Beijing (CN); BEIJING BOE MULTIMEDIA TECHNOLOGY CO., LTD., Beijing (CN)

( * ) Notice: Subject to any disclaimer, the term of this patent is extended or adjusted under 35 U.S.C. 154(b) by 235 days.

(21) Appl. No.: 15/567,906

(22) PCT Filed: Jun. 5, 2017

(86) PCT No.: PCT/CN2017/087153
§ 371 (c)(1),
(2) Date: Oct. 19, 2017

(87) PCT Pub. No.: WO2018/028282
PCT Pub. Date: Feb. 15, 2018

(65) Prior Publication Data
US 2018/0293369 A1 Oct. 11, 2018

(30) Foreign Application Priority Data
Aug. 11, 2016 (CN) .......................... 2016 1 0659719

(51) Int. Cl.
G06F 21/32 (2013.01)
H04W 4/02 (2018.01)
(Continued)

(52) U.S. Cl.
CPC .............. *G06F 21/32* (2013.01); *G06F 21/35* (2013.01); *G08B 21/02* (2013.01);
(Continued)

(58) Field of Classification Search
CPC ........... G06F 21/32; G06F 1/163; H04N 5/33; G08B 21/0225; G08B 21/0288;
(Continued)

(56) References Cited

U.S. PATENT DOCUMENTS

2011/0121975 A1* 5/2011 Dasher ..................... G07C 9/28
340/573.4
2012/0112903 A1* 5/2012 Kaib ..................... A61N 1/3993
340/539.12
(Continued)

FOREIGN PATENT DOCUMENTS

CN 104183086 A 12/2014
CN 204515777 U 7/2015
(Continued)

OTHER PUBLICATIONS

International Search Report and Written Opinion in PCT/CN2017/087153 dated Aug. 24, 2017, with English translation.
(Continued)

Primary Examiner — Daniel B Potratz
Assistant Examiner — Quazi Farooqui
(74) Attorney, Agent, or Firm — Womble Bond Dickinson (US) LLP

(57) ABSTRACT

This disclosure relates to a method for a wearable device as well as a wearable device and a positioning system associated therewith. The wearable device is attached to a wearer through an attachment assembly. The method comprises steps of collecting identity information of an operator operating the wearable device; detecting whether the collected identity information matches with pre-stored target identity
(Continued)

information; inhibiting detachment of the attachment assembly from the wearer if the collected identity information does not match with the pre-stored target identity information; acquiring position information of the wearable device; and sending the collected identity information along with the position information to a monitoring terminal for the wearable device. Therefore, usage security and reliability of the wearable device are improved.

20 Claims, 6 Drawing Sheets

(51) Int. Cl.
    *H04B 1/3827*     (2015.01)
    *G08B 21/18*     (2006.01)
    *G08B 21/02*     (2006.01)
    *G06F 21/35*     (2013.01)
    *G06F 1/16*     (2006.01)
    *H04N 5/33*     (2006.01)

(52) U.S. Cl.
    CPC ..... *G08B 21/0225* (2013.01); *G08B 21/0286* (2013.01); *G08B 21/0288* (2013.01); *G08B 21/182* (2013.01); *H04B 1/385* (2013.01); *H04W 4/023* (2013.01); *G06F 1/163* (2013.01); *G08B 21/0266* (2013.01); *G08B 21/0272* (2013.01); *H04N 5/33* (2013.01)

(58) Field of Classification Search
    CPC .. G08B 21/0286; G08B 21/182; G08B 21/02; G08B 21/0272; G08B 21/0266; G08B 21/18; H04B 1/385; H04B 1/3827; H04W 60/00; H04W 4/023; H04W 4/02; H04W 12/00; H04W 12/02; H04W 12/007; H04L 63/30–304

USPC ............................ 726/19, 17, 18, 35, 22, 25
See application file for complete search history.

(56) References Cited

U.S. PATENT DOCUMENTS

| | | | |
|---|---|---|---|
| 2016/0098138 A1* | 4/2016 | Park | G06F 3/00416 345/173 |
| 2016/0189450 A1* | 6/2016 | Anderson | G07C 9/29 340/5.51 |
| 2017/0061212 A1* | 3/2017 | Tanaka | G06K 9/00671 |
| 2017/0162031 A1* | 6/2017 | Drolshagen | A61B 5/117 |
| 2017/0337362 A1* | 11/2017 | Arunachalam | H04L 63/0861 |

FOREIGN PATENT DOCUMENTS

| | | |
|---|---|---|
| CN | 105224847 A | 1/2016 |
| CN | 204931655 U | 1/2016 |
| CN | 204964769 U | 1/2016 |
| CN | 105354901 A | 2/2016 |
| CN | 205121806 U | 3/2016 |
| CN | 105551161 A | 5/2016 |
| CN | 205250561 U | 5/2016 |
| CN | 205281757 U | 6/2016 |
| CN | 105829911 A | 8/2016 |
| CN | 106059615 A | 10/2016 |

OTHER PUBLICATIONS

Office Action received for Chinese Patent Application No. 201610659719.5, dated Jan. 30, 2018, 21 pages (12 pages of English Translation and 9 pages of Office Action).

* cited by examiner

METHOD FOR WEARABLE DEVICE AS WELL AS WEARABLE DEVICE AND POSITIONING SYSTEM ASSOCIATED THEREWITH

CROSS-REFERENCE TO RELATED APPLICATIONS

The present application is the U.S. national phase entry of PCT/CN2017/087153, with an international filling date of Jun. 5, 2017, which claims the benefit of priority from the Chinese patent application No. 201610659719.5 filed on Aug. 11, 2016, the entire disclosure of which is incorporated herein by reference.

TECHNICAL FIELD

This disclosure relates to the field of wearable technologies, and in particular to a method for a wearable device as well as a wearable device and a positioning system associated therewith.

BACKGROUND

With constant changes in society, child safety issues have become a hot topic all over the world. As electronic technologies develop rapidly, many wearable devices for preventing loss of children, such as electronic positioning watches, have appeared.

An existing wearable device generally comprises a positioning module and a communication module. When a wearer (e.g., a child) wears the wearable device, the wearable device can acquire the position information of the wearable device, i.e., the wearer, in real time via positioning module, and then send via the communication module the position information to a terminal carried by a guardian (e.g., a parent). As such, the guardian is able to know the position of the wearer in time and thereby prevent the wearer from getting lost.

However, when the wearer is not staying with the guardian, the wearable device may be separated from the wearer. This is due to the fact that the wearable device may be e.g. removed by the wearer or by people other than the guardian and the wearer. In this case, the wearable device cannot function to locate the wearer any longer and hence cannot function to prevent the wearer from getting lost.

SUMMARY

Embodiments of this disclosure are directed at a method for a wearable device as well as a wearable device and a positioning system associated therewith.

In one aspect, the embodiments of this disclosure relate to a method for a wearable device. The wearable device is attached to a wearer via an attachment assembly. The method comprises steps: collecting identity information of an operator operating the wearable device; detecting whether the collected identity information matches with pre-stored target identity information; when the collected identity information does not match the target identity information, inhibiting detachment of the attachment assembly from the wearer; acquiring position information of the wearable device; and sending the collected identity information along with the position information to a monitoring terminal for the wearable device.

Optionally, after acquiring position information of the wearable device, the method further comprises: acquiring distance information between the wearable device and a preset position; and sending the distance information to the monitoring terminal.

Optionally, after acquiring distance information between the wearable device and a preset position, the method further comprises: comparing a distance indicated by the distance information with a distance threshold; and when the distance indicated by the distance information is greater than the distance threshold, sending indication information to the monitoring terminal such that the monitoring terminal sends out a first alarm signal based on the indication information.

Optionally, after comparing a distance indicated by the distance information with a distance threshold, the method further comprises: when the distance indicated by the distance information is greater than the distance threshold, enabling to send out a second alarm signal at the wearable device.

Optionally, the identity information of the operator is an image of finger vein of the operator. The collecting step may be performed by capturing the image of finger vein of the operator with an infrared charge-coupled device (CCD) camera.

Optionally, after detecting whether the collected identity information matches with pre-stored target identity information, the method further comprises: when the collected identity information matches with the target identity information, allowing the attachment assembly to be detached from the wearer.

In another aspect, the embodiments of this disclosure relate to a wearable device. The wearable device comprises a positioner module, an identity identifier module, an attachment assembly and a communicator module. The attachment assembly is configured for attaching the wearable device to the wearer. The identity identifier module is configured for collecting identity information of an operator operating the wearable device, detecting whether the collected identity information matches with pre-stored target identity information, and when the collected identity information does not match with the pre-stored target identity information, inhibiting detachment of the attachment assembly from the wearer, and sending the collected identity information to the communicator module. The positioner module is configured for acquiring position information of the wearable device and sending the position information to the communicator module. The communicator module is configured for sending the collected identity information along with the position information to a monitoring terminal for the wearable device.

Optionally, the identity identifier module comprises: an identifier submodule, a storage submodule and a controller submodule. The identifier submodule is configured for collecting identity information of the operator. The storage submodule is configured for storing the target identity information. The controller submodule is configured for matching the collected identity information with the target identity information and determining whether to send a control instruction for detachment to the attachment assembly based on a matching result.

Optionally, the wearable device further comprises a protective shell. The positioner module, the identity identifier module, the attachment assembly and the communicator module are arranged within the protective shell. The attachment assembly comprises a motor, a spring, a metal handle and an engagement part arranged on a side surface of the protective shell. The spring is configured for controlling displacement of the metal handle through transitions between a compressed state and a free state. The metal handle is configured for, when the spring is in a compressed state, being compressed by the spring to join the engagement part, thereby enclosing a closed space together with the engagement part and the side surface of the protective shell, and when the spring is in a free state, being displaced under an external force to separate from the engagement part to form a gap therebetween. The motor is configured for producing a corresponding movement based on a control instruction of the control and storage submodule so as to control a state transition of the spring.

Optionally, the positioner module is further configured for acquiring distance information between the wearable device and a preset position, and sending the distance information to the controller submodule. The controller submodule is configured for sending the distance information to the monitoring terminal via the communicator module.

Optionally, the controller submodule is further configured for, when the distance indicated by the distance information is detected to be greater than the distance threshold, sending indication information to the monitoring terminal via the communicator module such that the monitoring terminal sends out a first alarm signal based on the indication information.

Optionally, the controller submodule is further configured for, when the distance indicated by the distance information is detected to be greater than the distance threshold, instructing to send out a second alarm signal at the wearable device.

Optionally, the identity information of the operator is an image of finger vein of the operator and the identity identifier submodule is a vein recognition submodule. The wearable device further comprises a sensing region arranged on a surface of the protective shell such that when the operator places his/her finger on the sensing region, the identifier submodule can capture the image of finger vein of the operator with an infrared charge-coupled device (CCD) camera.

Optionally, the wearable device further comprises a displayer module arranged on a surface of the protective shell. The displayer module is configured for displaying time, a matching result of the collected identity information and the target identity information, the alarm signal(s) and/or any operation prompt(s) corresponding to the attachment assembly.

In yet another aspect, the embodiments of this disclosure further relate to a positioning system comprising a monitoring terminal and the wearable device described above.

BRIEF DESCRIPTION OF DRAWINGS

This disclosure will be better understood and its numerous objects and advantages will become more apparent to those skilled in the art by reference to the following drawings in combination with accompanying detailed description.

DETAILED DESCRIPTION

Figure 1:
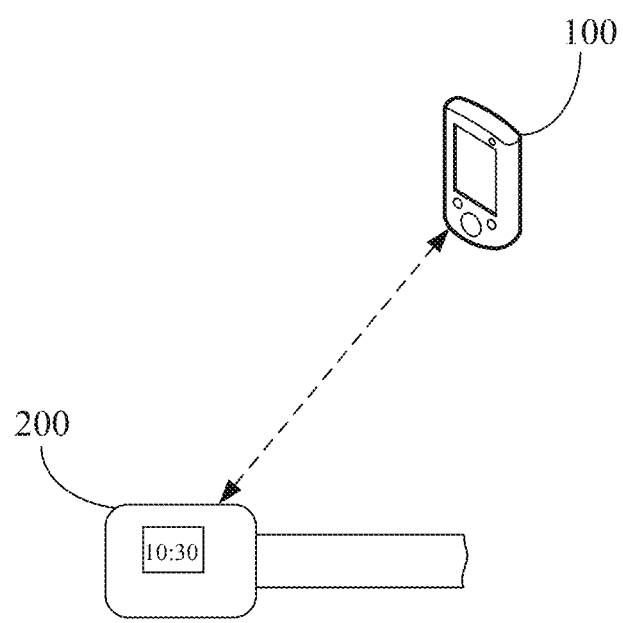
FIG. 1 shows a schematic view of an environment in which embodiments of this disclosure are implemented.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

FIG. 1 shows a schematic view of an exemplary implementation environment involved in embodiments of this disclosure. The implementation environment may comprise a monitoring terminal 100 and a wearable device 200.

The monitoring terminal 100 is held by a guardian, which may be an electronic device, such as a desktop computer, a cellphone, a tablet computer and a laptop computer.

The wearable device 200 is worn by a ward, i.e., a wearer. The wearer may be a family member like a child or an elderly person or any other subject that needs to be guarded. When the wearable device 200 is worn by the wearer, it may gather information about the wearer. For example, the wearable device 200 may gather position information via a positioning system such as GPS, and thereby determine a position where the wearer is located. Optionally, the wearable device 200 may gather physical condition information of the wearer, such as heart rate, body temperature and blood pressure, via sensors. The wearable device 200 may be a portable electronic device attached to a body part of the wearer or to clothes or accessories of the wearer. For instance, the wearable device may be a wearable watch or wristband attached to a wrist of the wearer.

The wearable device 200 is operative to communicate with the monitoring terminal 100 so as to periodically send wearer related information, such as position information or physical condition information of the wearer, to the monitoring terminal 100. Optionally, the wearer related information may also be sent upon a request from the monitoring terminal 100. As such, the monitoring terminal 100 may for example track the position of the wearer or monitor the physical condition of the wearer based on the wearer related information, thereby achieving the purpose of guarding. Herein, communications may be carried out by using one or more kinds of communication techniques. The communication techniques may comprise radio communication techniques, Internet techniques and/or any other applicable wireless or wired techniques.

As would be understood, although FIG. 1 shows only one monitoring terminal 100 and one wearable device 200, there may be a plurality of monitoring terminals 100 and a plurality of wearable devices 200 in this implementation environment. Moreover, it may be understood that in this implementation environment, one monitoring terminal 100 may monitor a plurality of wearable devices 200 (e.g., when a person needs to guard a plurality of children and/or elderly people at the same time), or a plurality of monitoring terminals 100 may monitor one wearable device 200 (e.g., when both parents guard a child at the same time).

In general, the wearable device is worn by the wearer and capable of sending wearer related information to the monitoring terminal. However, in some situations, the wearable device may also be removed from the wearer and thus separated from the wearer. At that point, the information received by the monitoring terminal from the wearable device may possibly not represent a real condition of the wearer. In this case, if the guardian continues to guard in dependent on such information, the purpose of effective guarding may not be achieved. Therefore, it may be advantageous to enable the guardian to be aware in time that the wearable device has been removed or detached from the wearer.

Figure 2:
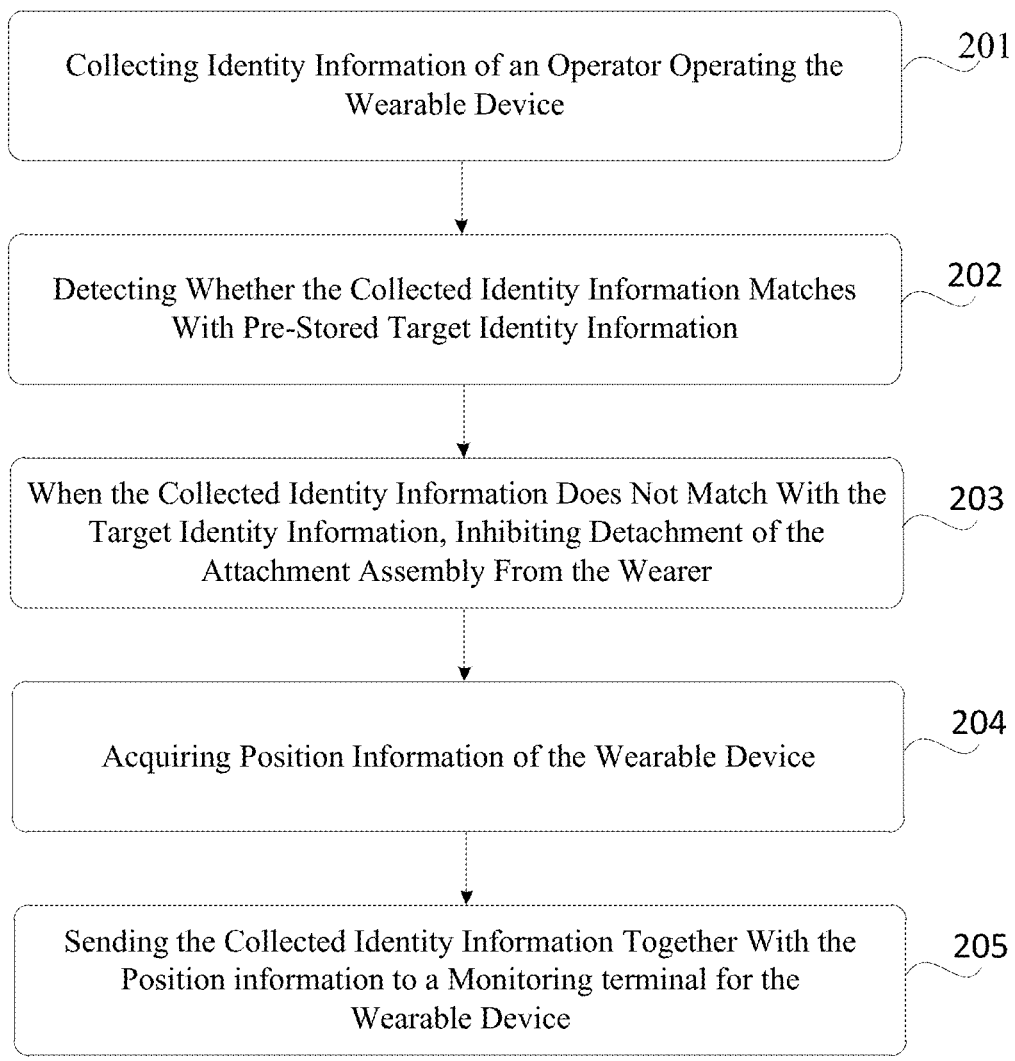
FIG. 2 shows a flow diagram of a method according to an embodiment of this disclosure.

FIG. 2 shows a flow diagram of a method for a wearable device according to some embodiments of this disclosure. The wearable device may be the wearable device 200 in the implementation environment as shown in FIG. 1, which is attached to a wearer, e.g., worn by the wearer, via an attachment assembly. As shown in FIG. 2, the method comprises steps as follows.

In step 201, identity information of an operator operating the wearable device is collected. Operation may be take-off of the wearable device from the wearer. Take-off may refer to detachment of the attachment assembly from the wearer for separating the wearable device from the wearer. The operator may be a guardian of the wearer or the wearer per se. In some cases, the operator may also be someone who intends to steal or destroy the wearable device with a malicious intention. Collection of the identity information may be carried out in various ways. For example, the collection may be carried out by picking up a voice of the operator. Optionally, the collection may also be carried out by capturing an image of a body part of the operator.

In step 202, whether the collected identity information matches with pre-stored target identity information is detected. In some embodiments, the target identity information may be identity information of a target operator who is authorized to take off the wearable device. The target operator is generally an operator of the monitoring terminal for the wearable device, i.e., the guardian for the wearer of the wearable device. Optionally, the target operator may also be a person trusted by the guardian. In some embodiments, the target identity information may be collected in advance and stored in the wearable device before the wearable device is used, and the target identity information may be identity information of one or more persons.

In step 203, when the collected identity information does not match with the target identity information, detachment of the attachment assembly from the wearer is inhibited. Inhibiting detachment of the attachment assembly may prevent the operator to take off the wearable device from the wearer. In some embodiments, the wearable device is prevented from being removed from the wearer by inhibiting a transition of the attachment assembly from a locking state to an unlocking state. For example, when the wearable watch is worn on a wrist of the wearer through a watchband, the wearable device may be prevented from being removed from the wearer by inhibiting to unlock a buckle of the watchband.

In step 204, position information of the wearable device is acquired. Since the wearable device is being worn by the wearer, the position information of the wearable device also indicates the position of the wearer. Herein, when the wearer wears the wearable device, the position of the wearable device and the position of the wearer can be used interchangeably. In some embodiments, the acquisition of position information may be performed periodically at a preset interval or immediately on demand. In some embodiments, the acquisition of position information is performed upon detection of mismatch between the collected identity information and the target identity information. As such, the position where an unauthorized operator intends to operate the wearable device may be known more accurately.

In step 205, the collected identity information along with the position information are send to a monitoring terminal for the wearable device. Herein, the monitoring terminal may be a terminal operated and monitored by the guardian of the wearer.

According to the method provided by the embodiments of this disclosure, when the identity information of the operator does not match with the pre-stored target identity information, the attachment assembly at the wearable device may be inhibited to be detached from the wearer, and meanwhile the collected identity information of the operator and the position information of the wearer may be sent to the monitoring terminal for the wearable device. As compared with a conventional wearable device, this increases the difficulty of taking off the wearable device from the wearer by an unauthorized operator, and facilitates the guardian to acquire the position information of the wearer. Meanwhile, this may further enable the guardian to acquire in time the identity information of an unauthorized operator, and thus improves usage safety and reliability of the wearable device.

Figure 3:
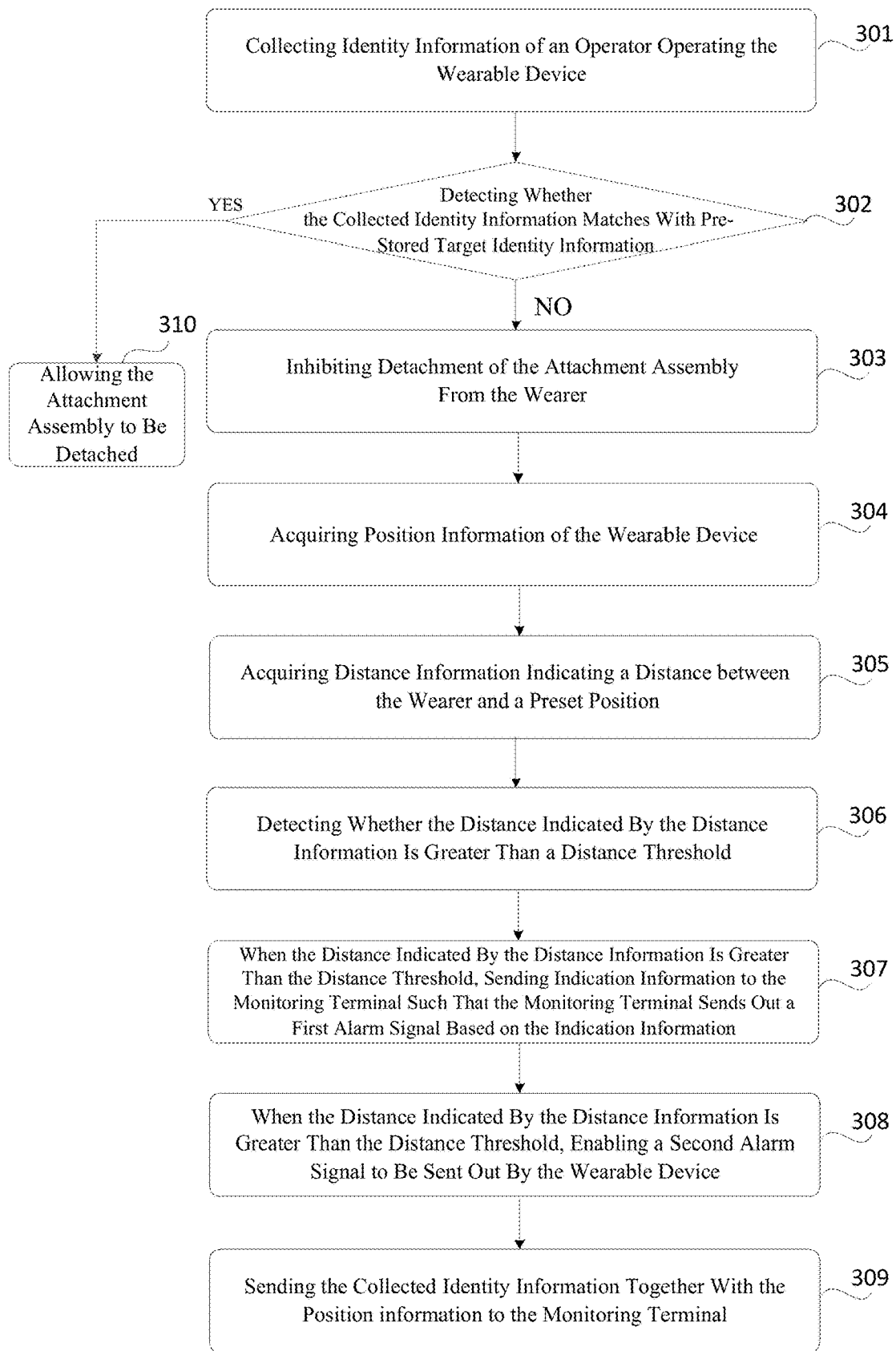
FIG. 3 shows a flow diagram of another method according to an embodiment of this disclosure.

FIG. 3 shows a flow diagram of another method for a wearable device according to some embodiments of this disclosure. The wearable device may be the wearable device 200 for use in the implementation environment as shown in FIG. 1, which is attached to a wearer via an attachment assembly. As shown in FIG. 3, the method comprises steps as follows.

Step 301, identity information of an operator operating the wearable device is collected.

Optionally, the identity information of the operator may be an image of finger vein of the operator. The collection may be carried out by capturing an image of finger vein of the operator with an infrared charge-coupled device (CCD) camera, and then the identity information of the operator may be identified based on the image of finger vein using a finger vein recognition technique. Herein, the finger vein recognition technique is a biometric authentication technique for identity identification using images of veins inside the fingers. This technique employs light having a specified wavelength to irradiate fingers such that the light is absorbed by blood flowing in the fingers, and thereby obtains images of finger veins. Since this technique employs transmitted light penetrating fingers to acquire image features of the veins inside, images of finger veins have a higher accuracy. Meanwhile, the finger of the operator does not have to contact the wearable device, so there will be no risk of malicious duplication of the vein features by others. Furthermore, it is required that the blood in fingers should be flowing when the images are captured, so others are unable to forge that. Therefore, the identity identification implemented by using images of finger veins has higher security. Besides, the entire identity identification procedure may take less than 1 second, so the operation is very convenient.

It may be understood that identity information of the operator may further be other biometric statistic information such as fingerprint information or palmprint information of the operator.

Step 302, whether the collected identity information matches with pre-stored target identity information is detected. When the collected identity information does not match with the target identity information, the process proceeds to step 303; and when the collected identity information matches with the target identity information, the process proceeds to step 310.

The pre-stored target identity information in the wearable device may be identity information of a guardian. The identity information may be fingerprint information of the guardian, or an image of finger vein of the guardian. Correspondingly, when the pre-stored target identity information is fingerprint information of the guardian, the fingerprint information of the operator may be collected in step 301. When the pre-stored target identity information is an image of finger vein of the guardian, the image of finger vein of the operator may be collected in step 301.

Step 303, detachment of the attachment assembly from the wearer is inhibited. When the wearable device detects that the collected identity information of the operator does not match with the pre-stored target identity information, this would indicate that the current operator is not an authorized operator like the guardian. At this point, the attachment assembly maintains in an attached state, for example a locking state, thereby preventing the wearable device from being removed. Accordingly, this increases the difficulty of taking off the wearable device from the wearer by an unauthorized operator, and facilitates the guardian to continuously monitor the position information of the wearer. The wearable device may be attached to the wearer via the attachment assembly. When the device is attached to the wearer, i.e., worn by the wearer, the attachment assembly is in an attached state. For example, when a wearable watch is worn on a wrist of the wearer, the watchband is in a locking state. When the wearable device is to be removed from the wearer, it is necessary to have the attachment assembly transit from an attached state to a detached state. For example, when the wearable watch is to be removed from the wrist of the wearer, it is required to unlock a buckle of the watchband to turn it into a unlocking state.

Step 304, position information of the wearable device is acquired. The wearable device acquires the current position information to achieve a positioning function. The wearable device may send in time the acquired position information, i.e., the position information of the wearer, to the monitoring terminal such that the guardian may know the position where the wearer is located in almost real time.

In some embodiments, optionally, in step 305, distance information indicating a distance between the wearer and a preset position may be further acquired.

Optionally, the preset position may be a position of the monitoring terminal. Alternatively, the preset position may also be a fixed location, such as a place known by the guardian where the wearer should be staying at the moment, e.g., the school of the child or a museum that the child is visiting. The wearable device may acquire at any time the distance information indicating the distance between the wearer and the position of the monitoring terminal or the fixed location, and send the distance information to the monitoring terminal such that the guardian may know in time how far the wearer is away from him/her or away from the fixed location.

Optionally, in step 306, detection as to whether the distance indicated by the distance information is greater than a distance threshold is performed. Optionally, the detection may be performed by the wearable device. Exemplarily, the distance threshold may be set as 50 meters.

In some embodiments, in step 307, when the distance indicated by the distance information is greater than the distance threshold, indication information may be sent to the monitoring terminal such that the monitoring terminal may send out a first alarm signal based on the indication information. Optionally, in this case, the indication information may be sent to the monitoring terminal by the wearable device, and the first alarm signal is used for prompting the guardian. Exemplarily, the first alarm signal may be: your child is over 50 meters away from you.

In some embodiments, in step 308, when the distance indicated by the distance information is greater than the distance threshold, a second alarm signal may additionally be sent out by the wearable device. Optionally, the second alarm signal is used for prompting the wearer. Exemplarily, the second alarm signal may be: you are over 50 meters away from your mother. In some examples, the second alarm signal may also be received by people near the wearer, which may facilitate the wearer to get help from people nearby in an emergency. Optionally, the distance threshold used in step 307 is a first distance threshold, and the distance threshold used in step 308 is a second distance threshold. The first distance threshold and the second distance threshold may be either the same or different. For instance, the second distance threshold may be smaller than the first distance threshold such that the wearer may be prompted comparatively earlier and hence possibly keep his/her motion within a safety range.

It should be noted that performances of step 308 and step 307 are not necessarily order dependent. Alternative ordering will be appreciated by one skilled in the art having the benefit of this description. For example, step 308 and step 307 may be performed simultaneously.

Step 309, when the collected identity information does not match with the target identity information, the collected identity information is sent along with the position information to the monitoring terminal after the position information of the wearable device is acquired. In this way, the guardian may be aware in time that an unauthorized operator is attempting to take off the wearable device from the wearer, i.e., the ward, and find the ward and determine an identity of the unauthorized operator in time based on the identity information and the position information of the wearer.

Optionally, when the monitoring terminal receives the identity information of the unauthorized operator sent by the wearable device, a third alarm signal may be further sent out to prompt the guardian: an unauthorized operator is operating the wearable device, so the ward may be in danger at the moment.

Optionally, the alarm signals may take the form of voice prompts, for example, voice broadcasting of related prompt information. Additionally or alternatively, the alarm signals may take the form of visual prompts, for example, display of related prompt information on a display screen of the monitoring terminal/the wearable device, flash of a signal lamp on the monitoring terminal/the wearable device. The alarm signals may further take any other suitable form that may draw attention of the guardian/the wearer.

Step 310, when the collected identity information matches with the target identity information, detachment of the attachment assembly from the wearer is allowed. Match between the collected identity information of the operator and the pre-stored target identity information indicates that the operator is an authorized operator like the guardian. At this point, the wearable device allows the attachment assembly to be detached from the wearer such that the guardian may take off/remove the wearable device from the wearer.

It should be noted that the order in which some or all of the operations are described should not be construed as to imply that these operations are necessarily order dependent. Alternative ordering will be appreciated by one skilled in the art having the benefit of this description.

Figure 4A:
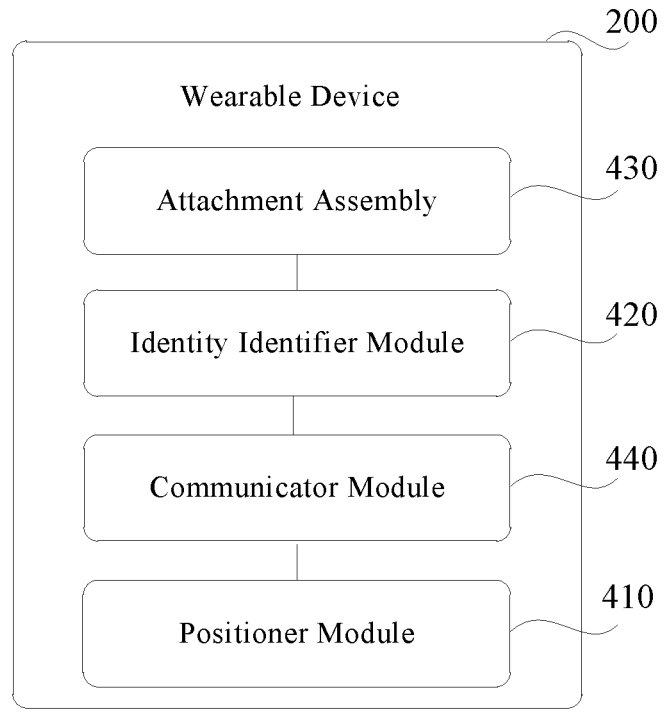
FIG. 4a shows a structural block diagram of a wearable device according to an embodiment of this disclosure.

FIG. 4a shows a structural block diagram of a wearable device 200 according to some embodiments of this disclosure. As shown in FIG. 4a, the wearable device 200 comprises a positioner module 410, an identity identifier module 420, an attachment assembly 430 and a communicator module 440.

The attachment assembly 430 is configured for attaching the wearable device to a wearer. The identity identifier module 420 is configured for collecting identity information of an operator operating the wearable device, detecting whether the collected identity information matches with pre-stored target identity information, and when the collected identity information does not match with the pre-stored target identity information, inhibiting detachment of the attachment assembly from the wearer so as to prevent the wearable device 200 from being removed from the wearer, and sending the collected identity information to the communicator module 400.

The positioner module 410 is configured for acquiring position information of the wearable device 200 and sending the position information to the communicator module 440.

The communicator module 440 is configured for sending the collected identity information along with the position information to the monitoring terminal for the wearable device.

Exemplarily, the positioner module 410 may be a global positioning system (GPS) module. The communicator module 440 may be a communication module employing wireless communication techniques, e.g., a general packet radio service (GPRS) module.

Figure 4B:
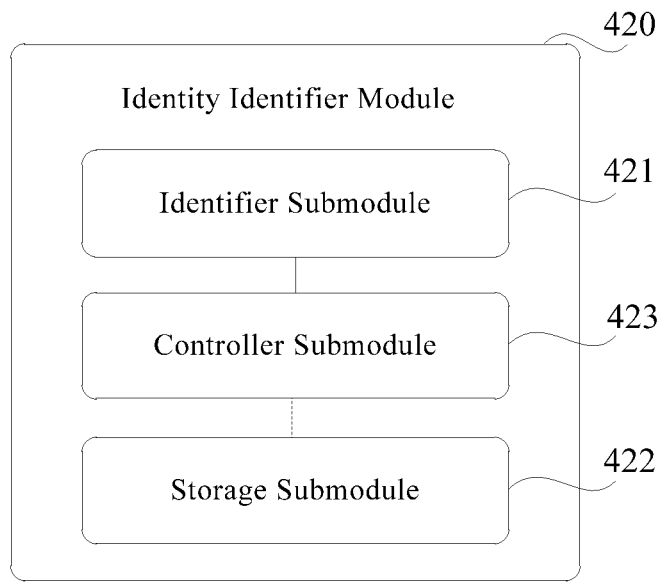
FIG. 4b shows a structural block diagram of an identity identifier module according to an embodiment of this disclosure.

FIG. 4b shows a structural block diagram of an identity identifier module 420 according to some embodiments of this disclosure. The identity identifier module 420 comprises an identifier submodule 421, a storage submodule 422 and a controller submodule 423.

The identifier submodule 421 is configured for collecting identity information of the operator. In some embodiments, the identity information of the operator may be an image of finger vein of the operator, or fingerprint information or any other suitable biometric statistic information of the operator.

The storage submodule 422 is configured for storing target identity information. The target identity information may be identity information of a guardian. The target identity information may be fingerprint information, or an image of finger vein. When the pre-stored target identity information is fingerprint information of the guardian, the identifier submodule may collect the fingerprint information of the operator; and when the pre-stored target identity information is the image of finger vein of the guardian, the identifier submodule may collect the image of finger vein of the operator.

The controller submodule 423 is configured for comparing the collected identity information with the target identity information to detect whether they match with each other and determining whether to send a control instruction for detachment to the attachment assembly based on a matching result. In some embodiments, the controller submodule 423 is configured for, when the collected identity information does not match with the target identity information, inhibiting detachment of the attachment assembly from the wearer by not sending the control instruction for detachment to the attachment assembly. The controller submodule 423 is further configured for sending the control instruction for detachment to the attachment assembly so as to allow the attachment assembly to be detached from the wearer when the collected identity information matches with the target identity information. For instance, the detachment instruction may make the attachment assembly transit from an attached state (e.g., a locking state preventing take-off of the wearable device from the wearer) to a detached state (e.g., an unlocking state allowing take-off of the wearable device from the wearer).

Mismatch between the identity information of the operator and the pre-stored target identity information indicates that the operator is not an authorized operator like the guardian. At this point, the controller submodule inhibits the attachment assembly to be detached from the wearer. Accordingly, this increases the difficulty of taking off the wearable device from the wearer by an unauthorized operator, and facilitates the guardian to continuously acquire the position information of the wearer. When the identity information of the operator matches with the pre-stored target identity information and the attachment assembly transits to a detached state based on the control instruction, the operator may open the attachment assembly and then take off the wearable device from the wearer.

In some embodiments, the positioner module 420 is further configured for acquiring distance information indicating a distance between the wearer and a preset position, e.g., the monitoring terminal, and sending the distance information to the controller submodule 423. The positioner module may not only monitor the position of the wearer in real-time, but also monitor the distance between the wearer and the preset position in real-time. The controller submodule may send the distance information acquired by the positioner module to the monitoring terminal of the wearer device via the communicator module such that the guardian may know in time how far the wearer is away from a preset position, e.g., away from the guardian himself or herself.

Optionally, the controller submodule 423 is further configured for, when the distance indicated by the distance information is detected to be greater than a first distance threshold, sending indication information to the monitoring terminal via the communicator module such that the monitoring terminal may send out a first alarm signal based on the indication information. The first alarm signal is used for prompting the guardian. Exemplarily, the distance threshold may be 50 meters.

Optionally, the controller submodule 423 is further configured for, when the distance indicated by the distance information is detected to be greater than a second distance threshold, instructing to send out a second alarm signal on the wearable device. In an example, the first distance threshold may equal the second distance threshold. The second alarm signal is used for prompting the wearer and/or for seeking help from people near the wearer. Exemplarily, when the distance between the wearer and the monitoring terminal is greater than 50 meters, both the wearable device and the monitoring terminal may send out alarm signals so as to prevent the wearer from getting lost.

Figure 5A:
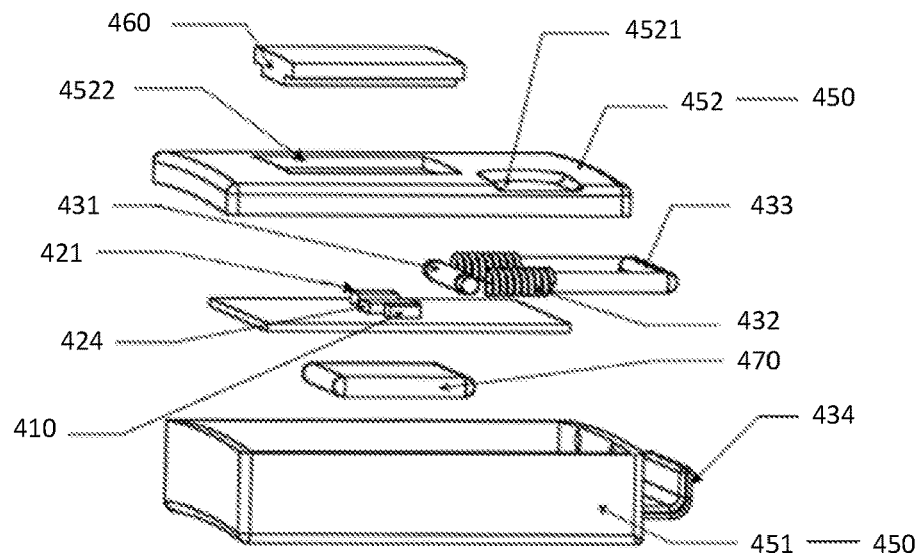
FIG. 5a shows a schematic structure view of a wearable device according to an embodiment of this disclosure.

FIG. 5a shows a schematic structure diagram of a wearable device 200 according to some embodiments of this disclosure. As shown in FIG. 5a, the wearable device 200 comprises a protective shell 450, and a positioner module 410, an identity identifier module 420, an attachment assembly 430 and a communicator module (not shown in FIG. 5a) arranged within the protective shell 450.

A wearer may wear the wearable device by means of the attachment assembly 430, for example by hooking the wearable device via the attachment assembly 430 to a band on a wrist of the wearer or another structure on another part of the wearer.

As shown in FIG. 5*a*, the identity identifier module 420 may comprise an identifier submodule 421, and a control and storage submodule 424. The attachment assembly 430 may comprise a motor 431, a spring 432, a metal handle 433 and an engagement part 434 arranged on a side surface of the protective shell 450. The attachment assembly may transit between an attached state and a detached state through actions of these components.

In FIG. 5*a*, the spring 432 contacts the motor 431 at one end, and contacts one end of the metal handle 433 at the other end. A long axis direction of the motor 431 is perpendicular to that of the spring 432. The spring 432 is configured for controlling displacements of the metal handle through transitions between a compressed state and a free state. The metal handle 433 is configured for joining to or separating from the engagement part 434 based on state transitions of the spring.

Figure 5B:
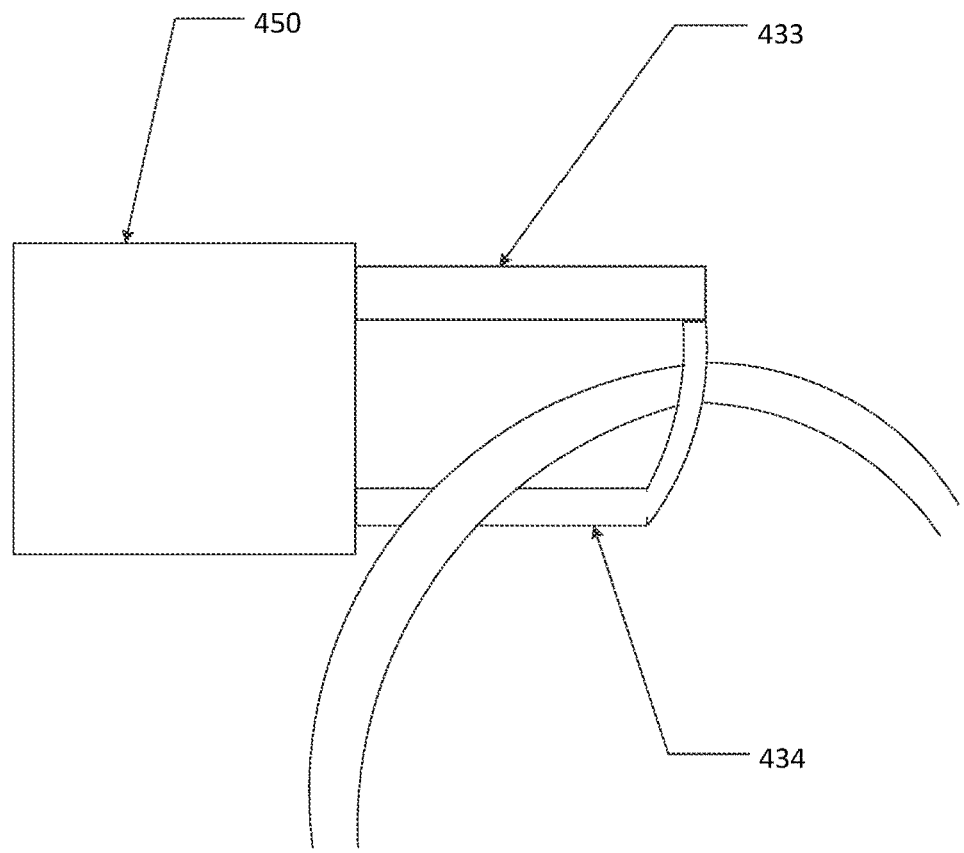
FIG. 5b shows a schematic view of an attached state of an attachment assembly according to an embodiment of this disclosure.

FIG. 5*b* shows a schematic view of an attached state of the attachment assembly 430 according to some embodiments of this disclosure. In an attached state (a locking state as shown in the drawing) of the attachment assembly 430, the spring 432 is in a compressed state and is compressed against the metal handle 433 such that the other end of the metal handle 433 is joined to the engagement part 434, thereby forming a closed space together with the engagement part and the side surface of the protective shell. In the attached state, for example, a band on the wrist of the wearer or another structure on his/her body may be locked within the closed space formed by the metal handle 433, the engagement part 434 and the side surface of the protective shell 450, thereby attaching the wearable device to the wearer.

Figure 5C:
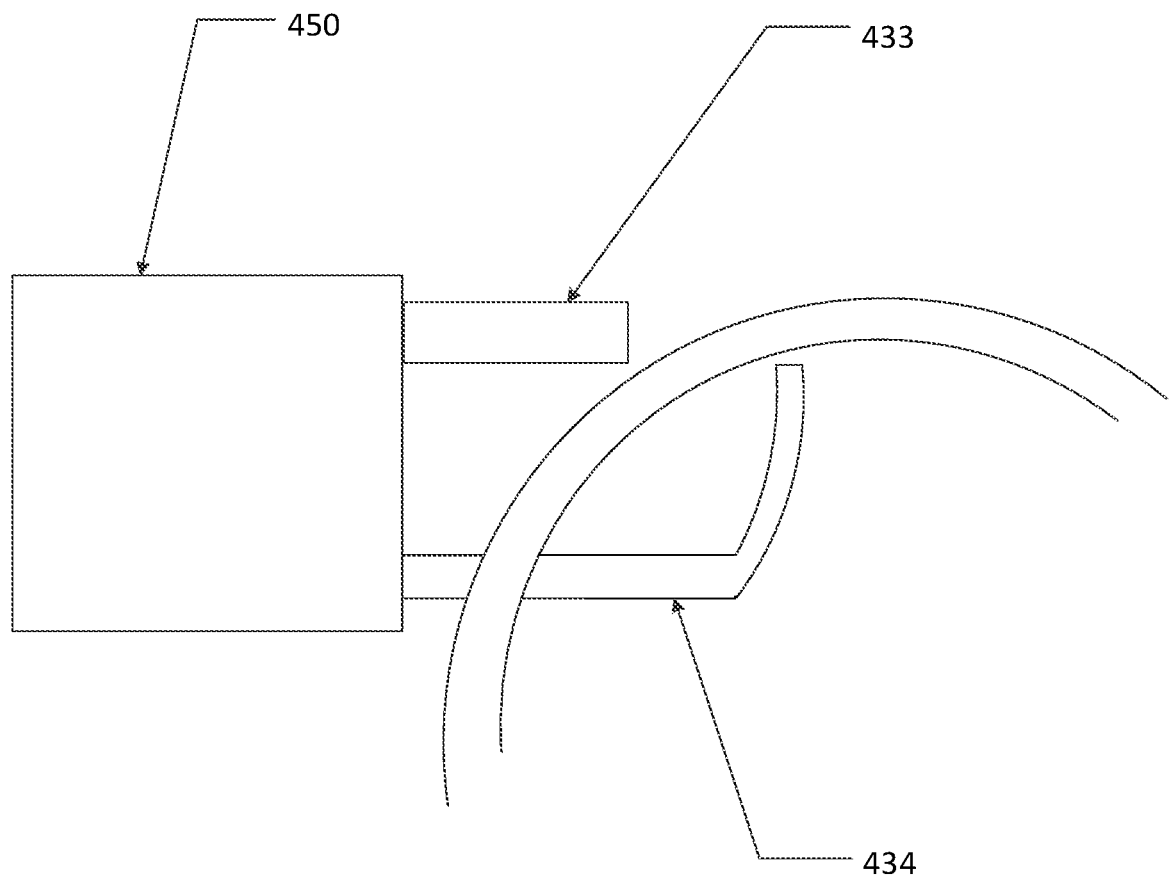
FIG. 5c shows a schematic view of a detached state of an attachment assembly according to an embodiment of this disclosure.

FIG. 5*c* shows a schematic view of a detached state of the attachment assembly 430 according to some embodiments of this disclosure. In a detached state (an unlocking state as shown in the drawing) of the attachment assembly 430, the spring 432 is in a free state so that the metal handle 433 is allowed to be displaced under an external force to separate from the engagement part 434, and a gap is then formed between the metal handle and the engagement part. As shown in FIG. 5*c*, in the detached state, the operator may press the metal handle 433 to make the metal handle 433 slide and separate from the engagement part 434. At this point, the other end of the metal handle 433 is not joined to the engagement part 434 and thus a gap is formed therebetween. A band or another structure on the body of the wearer may then be moved out of the space formed by the metal handle 433, the engagement part 434 and the side surface of the protective shell 450 via the gap, thereby allowing take-off of the wearable device from the wearer.

The motor 431 may produce a corresponding movement based on a control instruction of the control and storage submodule 424 so as to control a state transition of the spring 432 and in turn control a displacement of the metal handle 433, thereby achieving a state transition of the attachment assembly 430. For instance, when the motor 431 receives a control instruction for detachment sent by the control and storage submodule 424, the motor 431 is started and begins to rotate such that the spring 432 transits from a compressed state to a free state. The instruction for detachment, e.g., an instruction to unlock the attachment assembly, may be sent by the control and storage submodule 423 to the motor 431 after the identity information of the operator is compared with the target identity information using a comparison algorithm and when the identity information of the operator matches with the target identity information (e.g., indicating that the operator is the guardian). Upon receipt of the instruction for unlocking, the motor 431 may for example rotate clockwise such that the spring 432 transits from a compressed state to a free state and thus the metal handle 433 may be pressed to form a gap between the metal handle and the engagement part 434. Optionally, the motor 431 may stop after the rotation for 2 minutes such that the operator may have enough time to manipulate, e.g., press, the metal handle to move a band or another structure from the body of the wearer out via the gap, allowing take-off of the wearable device from the wearer. When the identity information does not match with the target information, the control and storage submodule 423 will not send the control instruction to the motor 431. At this point, the motor is not started and does not rotate, such that the metal handle 433 cannot be manipulated and hence still encloses a closed space together with the engagement part and the side surface of the protective shell. As such, the band or another structure on the body of the wearer is still locked within the enclosed space, which prevents the wearable device from being removed from the wearer.

In some embodiments, the motor 431 is further configured to, after rotation for a preset period of time, return to the position before the rotation starts. In one example, the motor 431 may automatically rotate counterclockwise and back to the position before the rotation starts such that the spring 432 transits from a free state to a compressed state. At this point, the spring 432 is compressed against the metal handle 433 such that the latter is joined to the engagement part 434 again and cannot slide.

Furthermore, referring back to FIG. 5*a*, the protective shell 450 further comprises: a housing 451 and a cover 452. The cover 452 is arranged on an upper end of the housing 451 and engaged with it so as to form a closed space to accommodate and protect components of the wearable device.

Optionally, the identity information of the operator is an image of finger vein of the operator. Correspondingly, the identifier submodule 421 is a vein recognition submodule. A sensing region 4521 is arranged on a surface of the protective shell, e.g., on a surface of the cover 452. When the operator places his/her finger on the sensing region 4521, the identifier submodule 421 may capture the image of finger vein of the operator with an infrared CCD camera. The identifier submodule 421 irradiates the sensing region 4521 with light emitted from the infrared CCD camera that has a specified wavelength. When the operator's finger is pressed on or approach the sensing region 4521 on the cover, the identifier submodule 421 will collect the image of finger vein of the operator and identify the identity of the operator. In practical application, the sensing region may be arranged as a structure similar to a switch button. In this way, when an operator intends to remove the wearable device from the wearer and sees this structure, he/she will intuitively press the region where the structure is located with his/her hand. When the finger of the operator contacts or approaches the sensing region, the identifier submodule may immediately collect the identity information of the operator, e.g., the image of finger vein. Besides, in order to enable the control and storage submodule 424 to store target identity information of an authorized operator like the guardian, the guardian may press his/her finger on the sensing region 4521 in advance so as to allow the identifier submodule to collect the target identity information of the guardian.

In some embodiments, when the identity information of the operator to be collected is fingerprint information of the operator, the identifier submodule 421 is correspondingly a fingerprint recognition submodule.

In some embodiments, as shown in FIG. 5a, the wearable device 200 further comprises a displayer module 460 arranged on the surface of the protective shell. Optionally, the displayer module 460 may be arranged within a recess region 4522 in the cover 452. The displayer module 460 may be configured for displaying time, a matching result of the identity information and the target identity information, alarm signal(s) and/or any operation prompt(s) corresponding to the attachment assembly. In one example, when the identity information of the operator does not match with the target identity information, the displayer module may display "identity mismatch". In another example, when the distance indicated by the distance information is detected to be greater than the second distance threshold, the displayer module 460 may display: "you are out of the safety region". In yet another example, when the motor of the attachment assembly will return to the position before the rotation starts after 5 seconds, the displayer module 460 may display: "the attachment assembly will be locked in 5 seconds".

Furthermore, as shown in FIG. 5a, the wearable device 200 further comprises a power source module 470. The power source module 470 is arranged within the protective shell 450. The power source module is used for providing electric power to the wearable device. Exemplarily, the power source module is a polymer lithium battery or a button cell. Optionally, the power source module is a chargeable battery.

It may be understood that any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code or instructions that perform specified tasks when executed on or by a processor (e.g., CPU or CPUs). The program code or instructions can be stored in one or more computer readable memory devices. The features of the techniques described herein are platform-independent, meaning that the techniques may be implemented on a variety of commercial computing platforms having a variety of processors.

Figure 6:
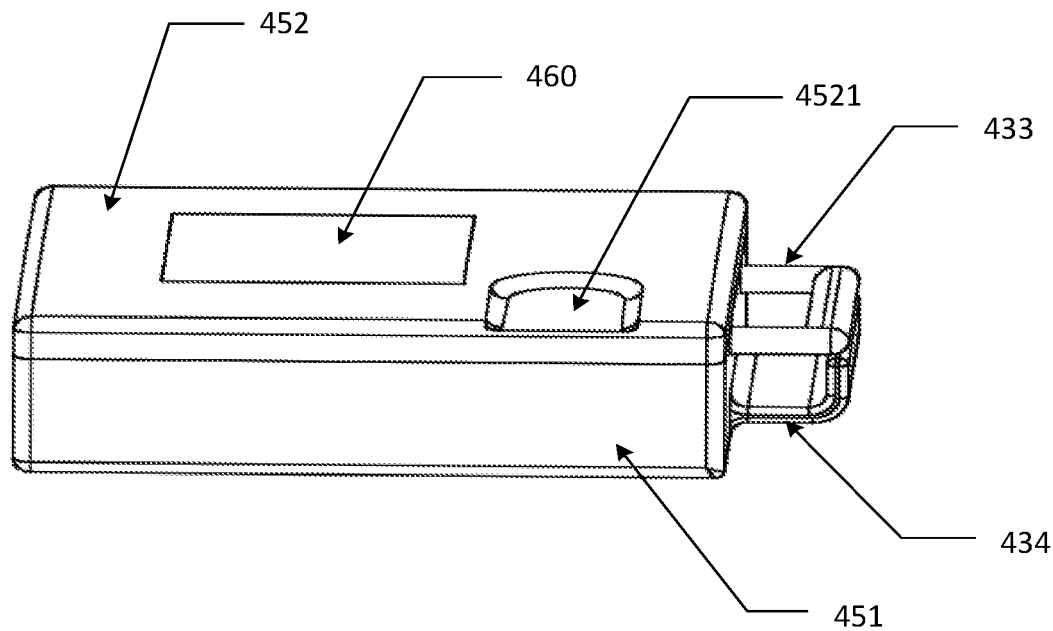
FIG. 6 shows a schematic appearance view of a wearable device according to an embodiment of this disclosure.

FIG. 6 shows a schematic appearance view of a wearable device according to some embodiments of this disclosure. As shown in FIG. 6, the protective shell of the wearable device comprises a housing 451 and a cover 452. The cover 452 is provided with a sensing region 4521 and a displayer module 460. One end of the metal handle 433 of the attachment assembly is joined to the engagement part 434 such that the attachment assembly is in an attached state. If the identity information of the operator does not match with the pre-stored target identity information, the wearable device may send the identity information of the unauthorized operator and the position information of the wearable device to a monitoring terminal for the wearable device such that a guardian may know timely a dangerous condition of the wearer and performs subsequent tracking with reference to the identity information of the unauthorized operator and the position information of the wearer when the wearer gets lost.

The wearable device according to embodiments of this disclosure may inhibit the attachment assembly to be detached from the wearer when the identity information of the operator does not match with the pre-stored target identity information, and send the collected identity information of the operator and the position information of the wearer to the monitoring terminal for the wearable device. As compared with a conventional wearable device, this increases the difficulty of removing the wearable device by an unauthorized operator, and facilitates the guardian to continuously acquire the position information of the wearer. Meanwhile, this also enables the guardian to acquire in time the identity information of an unauthorized operator, improving usage safety and reliability of the wearable device. The wearable device according to the embodiments of this disclosure has a simple structure and may be implemented easily.

The embodiments of this disclosure further provide a positioning system comprising a monitoring terminal and a wearable device. The wearable device may be a wearable device according to the embodiments of this disclosure, for example, the wearable device as shown in FIG. 4a, FIG. 4b, FIG. 5a or FIG. 6. The wearable device is used for executing methods according to embodiments of this disclosure.

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components, modules (e.g., elements, resources, etc.), the terms used to describe such components and modules are intended to correspond, unless otherwise indicated, to any component or module which performs the specified function of the described component or module (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application.

The invention claimed is:

1. A method for a wearable device, the wearable device being attached to a wearer via an attachment assembly, the method comprising steps of:
   collecting identity information of an operator who is to take off the wearable device from the wearer;
   detecting whether the collected identity information matches with pre-stored target identity information of a target operator who is authorized to take off the wearable device, wherein the operator and the wearer are different people;
   preventing the operator from taking off the wearable device from the wearer by inhibiting detachment of the attachment assembly from the wearer and acquiring position information of the wearable device upon detection of a mismatch between the collected identity information and the target identity information; and
   sending the collected identity information along with the position information to a monitoring terminal for the wearable device.

2. The method according to claim 1, wherein after said acquiring step, the method further comprises:

acquiring distance information between the wearable device and a preset position; and sending the distance information to the monitoring terminal.

3. The method according to claim 2, wherein after said acquiring distance information between the wearable device and a preset position, the method further comprises:

comparing a distance indicated by the distance information with a distance threshold; and if the distance indicated by the distance information is greater than the distance threshold, sending indication information to the monitoring terminal such that the monitoring terminal sends out a first alarm signal based on the indication information.

4. The method according to claim 3, wherein the method further comprises:

enabling to send out a second alarm signal at the wearable device if the distance indicated by the distance information is greater than the distance threshold.

5. The method according to claim 1, wherein the identity information of the operator is an image of finger vein of the operator, and said collecting step comprises: capturing the image of finger vein of the operator with an infrared charge-coupled device (CCD) camera.

6. The method according to claim 1, wherein after said detecting step, the method further comprises:

allowing the attachment assembly to be detached from the wearer if the collected identity information matches with the target identity information.

7. A wearable device, comprising: an attachment assembly, an identity identifier, a positioner, and a communicator, the attachment assembly being configured for attaching the wearable device to a wearer;

the identity identifier being configured for collecting identity information of an operator who is to take off the wearable device from the wearer and is different person from the wearer, detecting whether the collected identity information matches with pre-stored target identity information of a target operator who is authorized to take off the wearable device, preventing the operator from taking off the wearable device from the wearer by inhibiting detachment of the attachment assembly from the wearer if the collected identity information and the pre-stored target identity information do not match, and sending the collected identity information to the communicator;

the positioner being configured for acquiring position information of the wearable device upon detection of a mismatch between the collected identity information and the pre-stored target identity information and sending the position information to the communicator; and the communicator being configured for sending the collected identity information along with the position information to a monitoring terminal for the wearable device.

8. The wearable device according to claim 7, wherein the identity identifier comprises: an identifier submodule, a storage submodule and a controller submodule, the identifier submodule being configured for collecting identity information of the operator;

the storage submodule being configured for storing the target identity information; and the controller submodule being configured for matching the collected identity information with the target identity information and determining whether to send a control instruction for detachment to the attachment assembly based on a result of the matching.

9. The wearable device according to claim 8, wherein the wearable device further comprises:

a protective shell, and the positioner, the identity identifier, the attachment assembly and the communicator being arranged within the protective shell;

the attachment assembly comprising a motor, a spring, a metal handle and an engagement part arranged on a side surface of the protective shell;

the spring being configured for controlling displacement of the metal handle through transitions between a compressed state and a free state;

the metal handle being configured for, when the spring is in the compressed state, being compressed by the spring to join the engagement part, so as to enclose a closed space together with the engagement part and the side surface of the protective shell, and when the spring is in the free state, being displaced under an external force to separate from the engagement part to form a gap therebetween; and the motor being configured for producing a corresponding movement based on a control instruction of the controller submodule so as to control a state transition of the spring.

10. The wearable device according to claim 8, wherein the positioner is further configured for acquiring distance information between the wearable device and a preset position, and sending the distance information to the controller submodule; and the controller submodule is configured for sending the distance information to the monitoring terminal via the communicator.

11. The wearable device according to claim 10, wherein the controller submodule is further configured for, when a distance indicated by the distance information is detected to be greater than a distance threshold, sending indication information to the monitoring terminal via the communicator such that the monitoring terminal sends out a first alarm signal based on the indication information.

12. The wearable device according to claim 11, wherein the controller submodule is further configured for, when the distance indicated by the distance information is detected to be greater than the distance threshold, instructing to send out a second alarm signal at the wearable device.

13. The wearable device according to claim 9, wherein the identity information of the operator is an image of finger vein of the operator and the identity identifier submodule is a vein recognition submodule, and further comprises a sensing region arranged on a surface of the protective shell such that when the operator places his/her finger on the sensing region, the identifier submodule can capture the image of finger vein of the operator with an infrared charge-coupled device (CCD) camera.

14. The wearable device according to claim 11, wherein the wearable device further comprises a displayer module arranged on a surface of the protective shell, the displayer module being configured for displaying time, a matching result of the collected identity information and the target identity information, the alarm signal(s) and/or any operation prompt(s) corresponding to the attachment assembly.

15. A positioning system comprising a wearable device according to claim 7 and a monitoring terminal for monitoring the wearable device.

16. The positioning system according to claim 15, wherein the identity identifier comprises: an identifier submodule, a storage submodule and a controller submodule,
the identifier submodule being configured for collecting identity information of the operator;
the storage submodule being configured for storing the target identity information; and
the controller submodule being configured for matching the collected identity information with the target identity information and determining whether to send a control instruction for detachment to the attachment assembly based on a result of the matching.

17. The positioning system according to claim 16, wherein the wearable device further comprises:
a protective shell, and the positioner, the identity identifier, the attachment assembly and the communicator being arranged within the protective shell;
the attachment assembly comprising a motor, a spring, a metal handle and an engagement part arranged on a side surface of the protective shell;
the spring being configured for controlling displacement of the metal handle through transitions between a compressed state and a free state;
the metal handle being configured for, when the spring is in the compressed state, being compressed by the spring to join the engagement part, so as to enclose a closed space together with the engagement part and the side surface of the protective shell, and when the spring is in the free state, being displaced under an external force to separate from the engagement part to form a gap therebetween; and
the motor being configured for producing a corresponding movement based on a control instruction of the controller submodule so as to control a state transition of the spring.

18. The positioning system according to claim 16, wherein
the positioner is further configured for acquiring distance information between the wearable device and a preset position, and sending the distance information to the controller submodule; and
the controller submodule is configured for sending the distance information to the monitoring terminal via the communicator.

19. The positioning system according to claim 18, wherein
the controller submodule is further configured for, when a distance indicated by the distance information is detected to be greater than a distance threshold, sending indication information to the monitoring terminal via the communicator such that the monitoring terminal sends out a first alarm signal based on the indication information.

20. The positioning system according to claim 17, wherein the identity information of the operator is an image of finger vein of the operator and the identity identifier submodule is a vein recognition submodule, and
further comprises a sensing region arranged on a surface of the protective shell such that when the operator places his/her finger on the sensing region, the identifier submodule can capture the image of finger vein of the operator with an infrared charge-coupled device (CCD) camera.

* * * * *